United States Patent [19]

Manzato et al.

[11] 3,956,882
[45] May 18, 1976

[54] CONVERTIBLE HYDROGENATOR AND GAS TURBINE

[76] Inventors: Gustave A. Manzato; Camille B. Manzato, both of 28 Mountain Ave., Rockaway, N.J. 07866

[22] Filed: Jan. 28, 1975

[21] Appl. No.: 540,137

[52] U.S. Cl. .................. 60/39.12; 60/39.46 R; 60/39.28 T
[51] Int. Cl.² ................. F02B 43/10; F02C 3/20
[58] Field of Search ......... 60/39.46, 39.12, 39.28 T; 123/1 A

[56] References Cited
UNITED STATES PATENTS

| | | | |
|---|---|---|---|
| 2,766,583 | 10/1956 | Schirmen | 60/39.28 T |
| 2,784,550 | 3/1957 | Marcy et al. | 60/39.46 |
| 3,049,878 | 8/1962 | Goodall et al. | 60/39.28 T |
| 3,328,957 | 7/1967 | Rose | 60/39.46 |

FOREIGN PATENTS OR APPLICATIONS

| | | | |
|---|---|---|---|
| 200,668 | 1/1931 | France | 60/39.46 |

*Primary Examiner*—Carlton R. Croyle
*Assistant Examiner*—L. J. Casaregola
*Attorney, Agent, or Firm*—Paul J. Sutton

[57] ABSTRACT

A device conceived with the purpose of charging air with hydrogen to give it explosive power as a novel means for generating energy by utilizing the heat obtained from the combustion of these gases. Another purpose of the invention is that of utilizing the heat produced by such combustion for the expansion of air and steam for producing energy.

3 Claims, 1 Drawing Figure

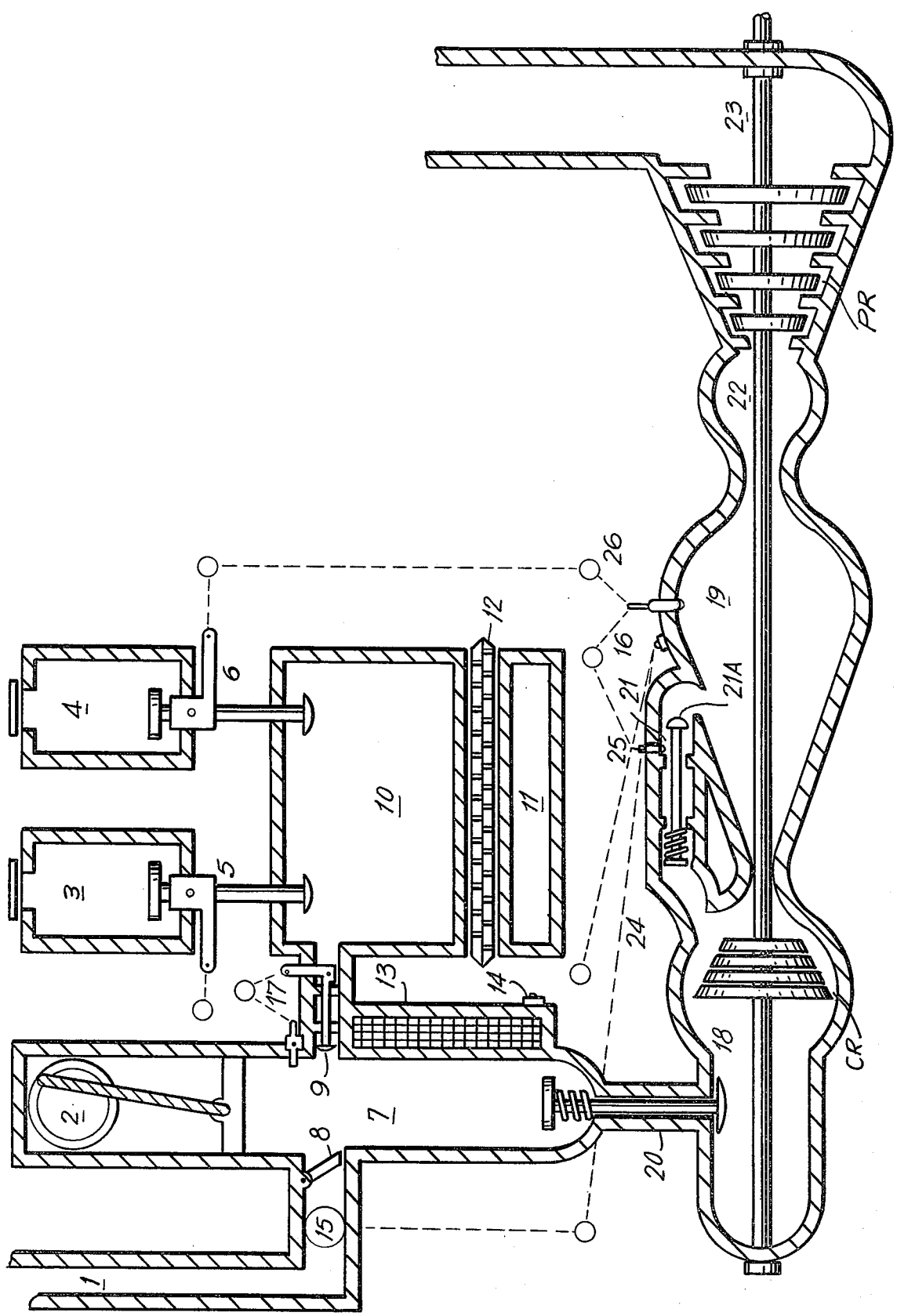

CONVERTIBLE HYDROGENATOR AND GAS TURBINE

This invention relates to an apparatus for generating hydrogen using reactants, and for supplying it, properly charged with air and heated, into a combustion chamber and provide means whereby the heat generated by such combustion is kept under constant control and to utilize the heat produced by such combustion to expand air and or steam with the purpose of producing energy.

Another object of this invention is related to a method of charging air with hydrogen to give it explosive power and utilize its heat to expand air and or steam, means for producing energy.

Another object of this invention is to utilize the clean heat produced by the combustion of hydrogen and air to produce high efficiency clean energy.

At ordinary temperature hydrogen is relatively inactive chemically, but when heated it enters into very active chemical reactions. In conceiving the method devised in this invention, this physical property of hydrogen has been taken into consideration particularly to the effect of utilizing it in a practical way for its everyday use in producing energy readily available.

It has also been taken into consideration the fact that the mixture of hydrogen and air will not ignite if the per cent of either gas is too small. The fact that, on account of its very low density, hydrogen diffuses faster than any other gas, makes it possible that such per cent may be easily altered. It thus becomes essential that the combustion takes place in one step after the hydrogen has been charged with air to avoid the effects of its diffusion.

Still further object of this invention will be apparent from the following description of the invention and illustrative examples of its application.

Some of the parts connected with remote controls being well known and forming no part of the present invention are not described as we consider such description unnecessary.

The apparatus of the invention comprises two containers of appropriate sizes, each to be filled with the chosen reactants and each being provided with proper vessels to transfer their contents into a mixing chamber through electrically operated valves which control the flow of the reactants. These valves are connected with the ignition key and are controlled by the accelerator. By widening or narrowing their openings there will be an increase or a decrease of flow of reactants which will affect in direct proportion the production of hydrogen in the mixing chamber.

The mixing chamber has, at its bottom, a rotating strainer covering a removable container to receive the salts produced in the reaction, and at its upper part an outlet with a fixed diameter opening governed by an electrically controlled valve which is connected with the movements of a suction and compression pump placed at the top of a blending and heating chamber.

The blending and heating chamber, besides having the hydrogen inlet governed by the electrically operated valve, has also an air inlet which has a variable volume capacity due to the presence of a thermostat controlled rotating diaphragm placed at its opening. A onestroke gravitational valve is placed at this air inlet.

The blending/heating chamber has, at its bottom, an outlet controlled by a spring-seated valve which will open at the compression stroke of the suction compression pump to allow, into the pressure chamber the gas now ready for ignition. The heating unit applied to the blending/heating chamber has a thermostat controlled switch connected with the conbustion chamber so that the heating unit will be switched-off when the desired temperature will be reached in the combustion chamber where the thermostat is applied.

The pressure chamber is provided with a compression rotor and discharges the compressed gas into the combustion chamber via a compressed-gas-elbow-duct which is provided with a spring-seated pressure valve which will open at the compression of the gases to allow into the combustion chamber the desired volume of gas and as the valve closes, the edge of its head will make contact with a switch placed in the elbow-duct in correspondence with the closure edge of the valve and connected with the spark-plug placed in the combustion chamber so as to ignite the gas.

The combustion chamber has an outlet into a pressure chamber and finally to the exhaust chamber where a propulson rotor may be placed to produce energy.

At the combustion chamber the thermostat applied as described above and connected with the heating unit, is also connected with the air-diaphragm so that should the temperature in the combustion chamber raise over the desired safe level, the air diaphragm will be caused to rotate and allow a larger volume of air into the blending chamber, thus, in obedience to the kinetic theory of gases, the proper safe temperature will be restored.

The suction and compression pump is connected with the accelerator which, when pressed or released, will increase or decrease the speed of the pump thus affecting in direct proportion the production of hydrogen, the frequency of combustion and the production of energy.

In its suction stroke, the pump will operate on the hydrogen intake valve placed between the mixing chamber and the blending chamber by means of the intake switch, so that a constant volume of hydrogen is supplied to the blender/heater chamber.

In the same suction stroke the pump will operate on the air intake one-stroke gravitational valve to allow the needed quantity of air coming through the air diaphragm.

With the purpose of better explaining the invention, reference is made to the accompanying drawing which is a diagrammatic and schematic illustration of the present invention.

In the attached illustration, containers 3 and 4 are for the reactants, valves 5 and 6 are for the control of the flow of reactants. Chamber 10 is the mixing chamber, 12 is the rotating strainer and 11 is the removable container for precipitates (salts). Valve No. 9 is placed at the outlet of mixing chamber and is governed by intake switch No. 17 which is connected with the suction/compression pump No. 2.

Duct 1 is for the air intake governed by the air-diaphragm No. 15 placed before air intake one-stroke valve 8 communicating with gas mixing chamber No. 7 and connected with thermostat No. 16 placed at the combustion chamber No. 19- Thermostat No. 16 is also connected with heating unit No. 13 and operates on switch No. 14 applied to the heat unit. A valve 20 is provided intermediate chamber 7 and chamber 18 to control the flow of gases from chamber 7 to chamber 18.

CR is the compression rotor placed in the compression chamber No. 18 and PR is the propulsion rotor placed at the exhaust chamber No. 23 Contact switch No. 25, placed in elbow-duct No. 21 is operated by the edge of valve-head No. 21 when compression of gases into the explosion chamber is completed and will operate on spark-plug No. 26 which will ignite the gas in chamber No. 19 and cause them to flow through compression chamber No. 22 into exhaust chamber No. 23 through propulsion rotor P.R.

The convertability of the device consists on the option given to use a great variety of reactants according to the availability of material at the time when energy is needed, such as acids on metals or, until such time as hydrocarbons are obtainable at convenient prices, as compared with other sources of energy, one may chose these types of reactants. For instance, the reaction on Kerosene of a solution of water and Sodium Hydroxide would develope as follows:

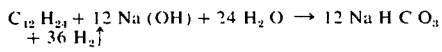

Thus, by employing 1080 grams of material, of which 168 grams of kerosene, 480 grams of Sodium Hydroxide and 432 grams of Water, we will obtain 72 grams of Hydrogen or 2,400 Kcal equivalent to 168 HP for one hour, as against 2,020 Kcal or the equivalent of 139 HP for one hour obtainable from the normal use of Kerosene. This represents an improvement of 26% or, from the standpoint of ENERGY CONSERVATION, an economy of 26% of fuel.

From the standpoint of economy, one may easily calculate the value of the by-product ($Na H C O_3$) obtained and the cost of the materials used to establish the convenience of using this method.

It should be also easy to realize that the device offers the possibility of limitless applications as its convertibility into various types of combustions is quite apparent.

Our main consideration, however, is not only that of the economical advantage, but also that of eliminating air-pollution totally from the production of energy in as much as the combustion of hydrogen with oxigen produces just pure water vapor.

The objects exposed above are attained by a combination and arrangement of parts as described and claimed hereinafter.

We claim:

1. A hydrogen motor device comprising in combination hydrogen-reactant-fuel channeling means for channeling contained hydrogen-producing reactant to a feed point thereof; second fuel-reactant channeling means for channeling contained hydrogen-replacing reactant, reactive with hydrogen producing reactant to produce hydrogen gas, to a feed point therefore; mixing chamber means including a substantially enclosed reaction vessel structure having a first inlet port and the valve means therefor for feeding the contained hydrogen-producing reactant from its feed point into an enclosure space defined within the reaction vessel structure and a second inlet port and second valve means therefor for feeding the contained hydrogen replacing reactant from its feed point into the enclosure space, said reaction vessel structure further having an outlet port located for channeling hydrogen gas from said enclosure space and outlet valve means for controlling flow of hydrogen through said outlet port; gas mixing chamber means defining a mixing chamber for gases and including a gas compression structure, an oxidizing reactant-gas inlet port and one-way inlet valve means therefor and rate-of-feed gas control valve means mounted operatively in series with one-way inlet valve means in flow communication with said oxidizing reactant-gas inlet port, and a gas mixing chamber outlet port and third valve means therefor for controlling outlet flow of mixing gases under compression from the mixing chamber for gases; a compression chamber having drive impeller means mounted within means therefor for supplementing the compression of gases and means for channeling the compressed gas through a pressure valve placed in an inlet port into a combustion chamber means defining two serially connected chamber structures having a first opening in flow communication with the compression chamber and a controlled inlet port preventing the gas of the explosion from flowing upstream, the expanded, heated gas from said communicating combustion chamber means flowing outwardly through a second chamber outlet and a turbine rotor which extracts useful power therefrom; ignition means mounted for initiating ignition of a heated, compressed mixture of hydrogen gas and oxidizing reactant-gas within said combustion structure when a contact switch placed in connection with the inlet valve of the compressed gas in the combustion chamber completes the circuit with the said ignition device, means for obtaining ignition of compressed gas in the combustion chamber means when compression is completed; heating-element means for variably and controlably heating said mixing chamber for gases and mounted in association therewith; sensing and control means for detecting temperature within said combustion chamber means and for regulating rate-of-feed of the rate-of-feed gas control valve means in direct proportion with increase and decrease in temperature respectively within said combustion chamber means, compression occurring in said compression chamber between mixing in said mixing chamber for gases and the firing of said combustion chamber means.

2. A hydrogen motor device in which the heating-element means includes operative connections with said sensing and control means as in claim 1, said sensing and control means includes a thermostatic element connected to regulate predetermined temperature of heating element structure for heating of the mixing chamber for gases and the thermostatic element having a sensing element located to be responsive to the temperature within the first of said serially connected chamber structures.

3. A hydrogen motor device of claim 1, in which the compressed mixture of hydrogen gas and oxidizing reactant-gas ready for ignition is channeled from the compression chamber into the combustion chamber through an elbow pipe containing a spring-seated compression valve having a contact switch at its closure means for channeling the said mixture of compressed gases, and said sensing and control element being located to be responsive to the proper time for ignition.

* * * * *